(No Model.)

M. SWENSON.
DEFECATING PAN.

No. 411,112. Patented Sept. 17, 1889.

Witnesses:
Hamilton D. Turner
William D. Conner

Inventor:
Magnus Swenson
by his Attorneys
Howson & Howson

UNITED STATES PATENT OFFICE.

MAGNUS SWENSON, OF FORT SCOTT, KANSAS.

DEFECATING-PAN.

SPECIFICATION forming part of Letters Patent No. 411,112, dated September 17, 1889.

Application filed December 26, 1888. Serial No. 294,677. (No model.)

*To all whom it may concern:*

Be it known that I, MAGNUS SWENSON, a citizen of the United States, and a resident of Fort Scott, Bourbon county, Kansas, have invented certain Improvements in Defecating-Pans, of which the following is a specification.

The object of my invention is to so construct a cane-juice defecator that the elimination of impurities from the juice will be effected more thoroughly and with less care on the part of the attendant than in other apparatus of this class with which I am familiar, and this object I attain in the manner hereinafter set forth, reference being had to the accompanying drawings, in which—

Figure 1:
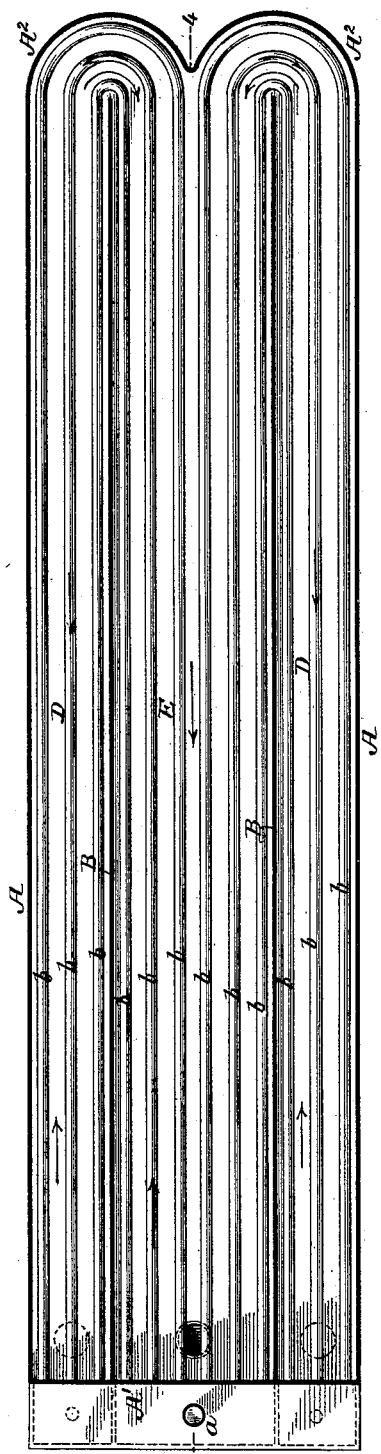
Figure 2:
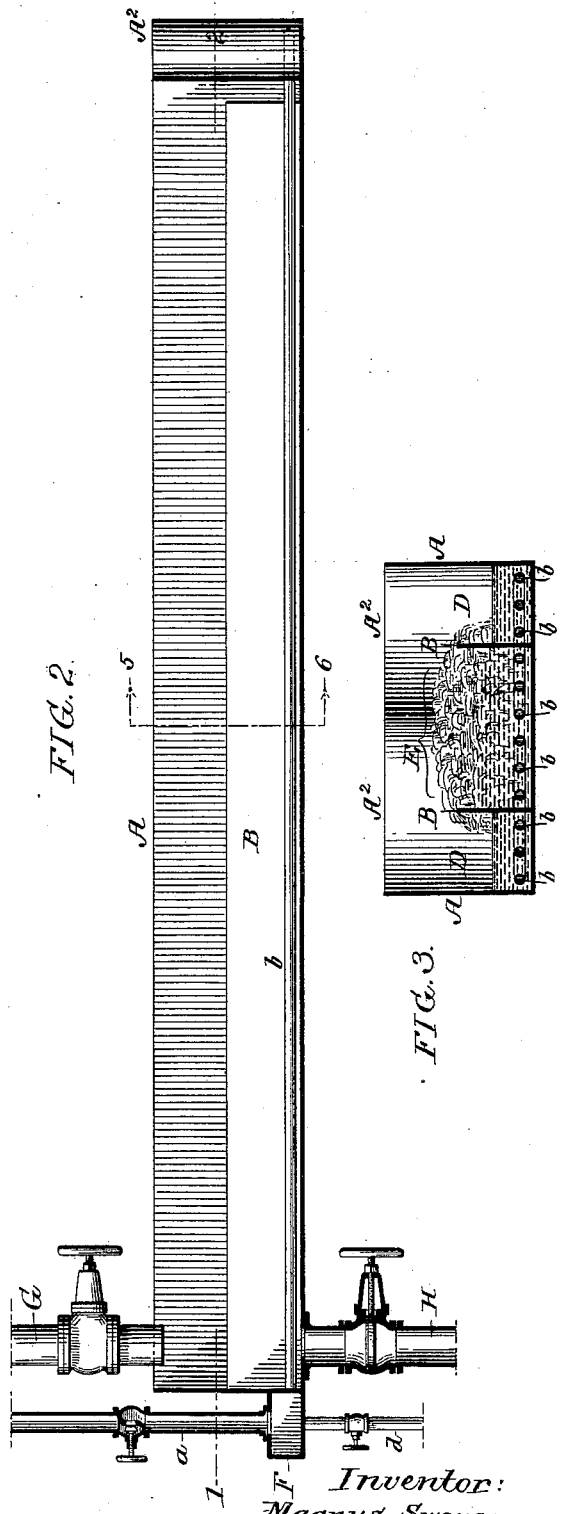
Figure 3:
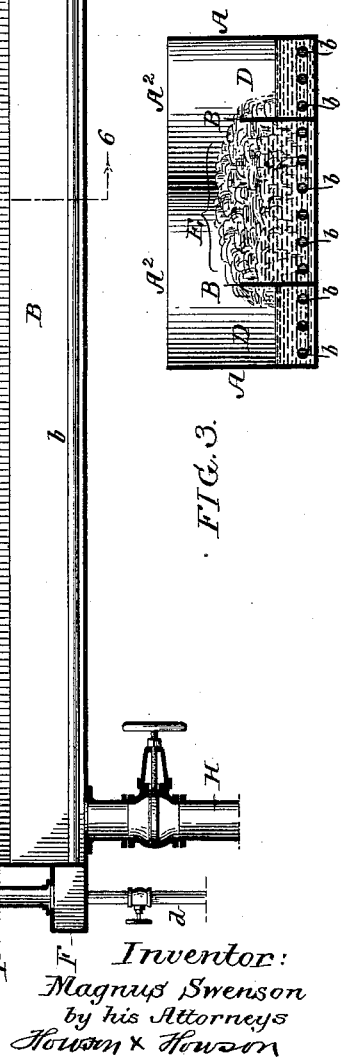

Figure 1 is a sectional plan view of a cane-juice defecator constructed in accordance with my invention, the section being taken on the line 1 2 of Fig. 2. Fig. 2 is a longitudinal section of the defecator on the line 3 4 of Fig. 1, and Fig. 3 is a transverse section on the line 5 6 of Fig. 2.

A A are the straight sides of the pan, the end A' being straight or of any other convenient shape, but the opposite end being preferably composed of two segments $A^2$, meeting at the longitudinal center of the pan, as shown in Fig. 1, for a purpose described hereinafter.

Extending longitudinally along the pan are partitions B B, so located in respect to the sides of the pan that the space transversely from partition to partition is about twice the width of the space between each partition and the outer side A of the pan, the partitions extending from the end A' of the pan to within a short distance of the opposite segmental end $A^2$ of the same, so as to form opposite narrow channels D D and a central wider channel E, these channels communicating with each other around the ends of the partitions B.

At the end A' of the pan is a box F, partitioned so as to form a central compartment of about the width of the central channel E of the pan and opposite side compartments each about equal in width to one of the side channels D of the pan, each side compartment communicating with the central compartment through the medium of pipes $b$, which extend along the side channels of the pan, around the ends of the partitions B, and thence along the central channel, as shown in Fig. 1.

Steam is supplied to the central compartment of the box F through a valved pipe $a$, and the steam and water of condensation pass from the opposite side compartments of the box through valved pipes $d$, so that steam is caused to flow through the pipes $b$ in the course indicated by the arrows on said pipes in Fig. 1.

The juice to be defecated is contained in a tank above the pan, in which tank it can be limed or otherwise appropriately treated, and it is allowed to flow from this tank through valved pipes G into the closed end A' of each of the side channels D of the pan, the juice flowing along each side channel toward the opposite end of the pan, thence passing around the ends of the partitions and into the central channel of the pan, and flowing in the opposite course along the latter, as indicated by the arrows in Fig. 1, the juice finally escaping from the pan through a valved pipe H. It will thus be observed that the juice flows through the pan in a direction the reverse of the flow of steam through the heating-pipes $b$, so that the juice in its flow is subjected to a constantly-increasing degree of heat. The flow of steam through the heating-pipes and the flow of juice through the channels of the pan should be so regulated that the juice will reach the boiling-point when it is about to pass from the ends of the side channels into the end of the central channel, the boiling becoming more and more violent as the juice passes along said central channel toward the outlet. As the juice boils it will foam up more and more in the central channel of the pan until, after it has passed through a portion of the length of this channel, it will boil over into the opposite side channels, as shown in Fig. 3, the partitions B B being considerably less in height than the sides of the pan in order to permit this without risk of the juice boiling over the sides themselves. As the impurities are cast up to the surface owing to the violent boiling of the juice as it approaches the outlet end of the central channel, these impurities will be carried over by the foam into the side compartments, from which they can be readily removed, as the juice in these compartments has not yet reached the boiling-point. At the same time there is a backward current of scum in the central channel of the pan—that is to say, a current toward the end $A^2$ of the pan—so that this scum can be readily removed by the usual skimmer in the hands of an attendant located at said end $A^2$ of the pan.

The segmental ends $A^2$ of the pan serve to aid in properly guiding and directing the stream of juice flowing from the side channels of the pan into the central channel of the same, as will be readily understood, and although my invention may be carried out without imparting this shape to the end of the pan, the shape shown is preferred, for the reason given.

Having thus described my invention, I claim and desire to secure by Letters Patent—

1. The combination of the pan having longitudinal partitions therein dividing the pan into opposite side channels and a central channel communicating with each other at one end of the pan, but closed at the opposite end of the same, with heating-pipes in said channels, juice-supply pipes communicating with the closed ends of the side channels, and a juice-discharge pipe communicating with the closed end of the central channel, substantially as specified.

2. The combination of the pan having partitions forming opposite side channels and a central channel communicating with each other at one end of the pan, but closed at the opposite end of the pan, with pipes for supplying juice to the closed ends of the side channels, a pipe for discharging the juice from the closed end of the central channel, heating-pipes located in said channels, a steam-supplying box for said pipes at the closed end of the central channel, and discharge-boxes at the closed ends of the side channels, whereby the steam in the heating-pipes and the juice in the pan are caused to travel in opposite courses, substantially as specified.

3. The combination of the outer casing of the pan with the longitudinal partitions therein less in height than the outer casing, and forming within the pan opposite side channels and a central channel communicating with each other at one end of the pan, but closed at the opposite end of the same, heating-pipes in said channels, pipes supplying juice to the closed ends of the side channels, and a pipe for discharging the juice from the closed end of the central channel, substantially as specified.

4. The combination of the pan having one end in the form of a pair of segments meeting at or about the longitudinal center of the pan, with longitudinal partitions forming in the pan opposite side channels and a central channel communicating with each other at the segment end of the pan, but closed at the opposite end of the pan, juice supply and discharge pipes, and heating-pipes in the channels, substantially as specified.

In testimony whereof I have signed my name to this specification in the presence of two subscribing witnesses.

MAGNUS SWENSON.

Witnesses:
   J. H. BARRY,
   J. C. HART.